May 27, 1958  J. H. MASTERS  2,836,073
TRACTOR POWER TRANSMISSION
Filed Sept. 20, 1955  2 Sheets-Sheet 1

INVENTOR.
JOHN H. MASTERS
BY
Bates, Teare & McBean
ATTORNEYS

May 27, 1958  J. H. MASTERS  2,836,073
TRACTOR POWER TRANSMISSION
Filed Sept. 20, 1955  2 Sheets-Sheet 2

INVENTOR.
JOHN H. MASTERS
BY
Bates, Teare + McBean
ATTORNEYS

United States Patent Office 2,836,073
Patented May 27, 1958

2,836,073

TRACTOR POWER TRANSMISSION

John H. Masters, Bainbridge, Ohio, assignor to Bready Tractor & Implement Company, Solon, Ohio, a corporation of Ohio Application September 20, 1955, Serial No. 535,472

4 Claims. (Cl. 74—355)

This invention relates to farm and garden implements generally and more particularly to an improved arrangement for connecting and controlling the application of power to the driving wheels of a tractor.

The invention is applicable to a wheeled tractor having a tractor frame for supporting a power unit with handles extending rearwardly so that an operator may walk behind the tractor and guide its direction. Motive power is ordinarily transmitted from the power unit on the tractor frame to the wheels through various types of power transmissions, most of which, in relation to the simplicity of the tractor frame construction, are exceedingly complex in construction and in operation. For example, to change the direction of the wheeled drive or otherwise to isolate it from the power unit, ordinarily requires the interchanging of belts and pulleys and operation of a plurality of handles.

Thus, a principal object of this invention relates to the provision of an improved power transmission mechanism and control which is simple in construction and which can be easily manipulated to reverse the direction of drive or to isolate the tractor drive from the power unit.

Briefly, the principal objective of this invention is obtained in accordance with this invention by coupling a power receiving gear train to the wheel axle and then selectively engaging this gear train with either a forward or reverse gear of a power transmitting gear train which is coupled to the power unit. In the alternative, the gear trains may be disengaged to isolate the tractor from the power unit. The arrangement also contemplates that the power transmitting gear train will normally be biased in a driving position thereby requiring positive manipulation of a control handle only when it is desired to reverse the direction of drive or otherwise isolate the tractor wheels from the power unit.

In the drawings, Fig. 1 is a perspective view of a wheeled tractor frame embodying this invention with one of the wheels removed to show the power transmission mechanism in relation to the tractor frame;

Figure 1:
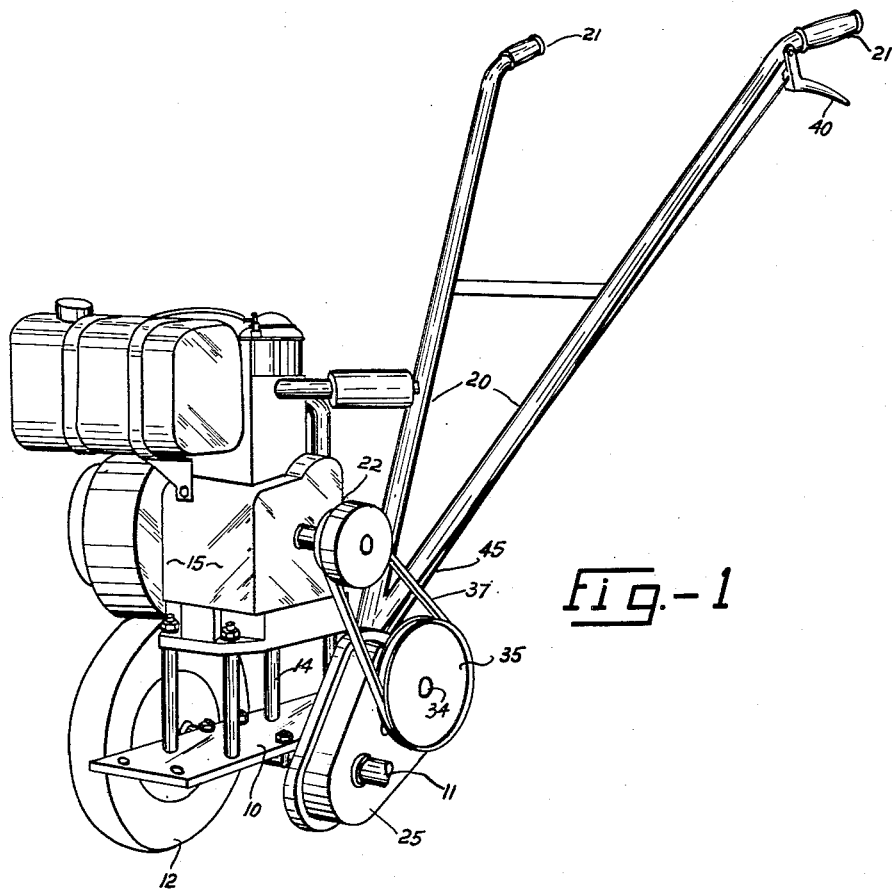

Referring now more particularly to Fig. 1, there is illustrated a two wheeled tractor including a frame 10 in which is journaled a wheel axle 11 carrying ground-engaging wheels like 12. The frame 10 embodies a plate having vertically extending supports indicated generally at 14 which support an engine 15 forming the power unit. The wheeled tractor frame is guided by handles 20 which extend rearwardly from the frame 10 and terminate in handle bars 21 so that the tractor can be guided by an operator walking at the rear. The power unit 15 has a power take-off in the form of a driven pulley wheel 22 at one side of the frame 10. The pulley wheel 22 is drivingly coupled to the tractor wheels through the power transmission mechanism with which this invention is more particularly concerned and in a manner that will be hereinafter more fully described.

Figure 2:
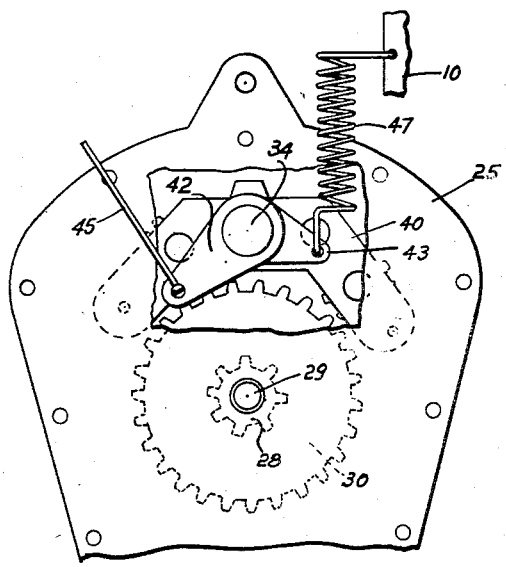
Fig. 2 is a partial view of the power transmission housing with a portion of the housing wall broken away to illustrate the arrangement for controlling the power mechanism.

The power transmission mechanism of this invention includes a power receiving gear train and a power transmitting gear train enclosed within a suitable housing 25 which is otherwise secured to the tractor frame by a stud 13. This is shown in greater detail in Figs. 2 to 4 of the drawings. The power receiving gear train includes a main gear wheel 27 which is keyed onto the wheel axle 11 and meshes with a pinion 28 carried by a shaft 29 on which is keyed a speed reducing gear wheel 30. The speed reducing gear wheel 30 is adapted to be selectively engaged by one of the driven gear wheels 31 or 32 of the power transmitting gear train to drive the wheel axle in a forward or reverse direction. These driven gear wheels receive their power from a driving gear 33 which is keyed to a driven shaft 34 in the housing 25. The shaft 34 carries a pulley wheel 35 external of the housing which is drivingly coupled to the pulley wheel 22 by means of a flexible belt 37 to transmit power from the power unit 15 to the power receiving gear train. The gear wheel 32 is driven in a direction opposite from gear wheel 31 by introducing a follower gear wheel 36 between it and the driving gear wheel 33.

Figure 3:
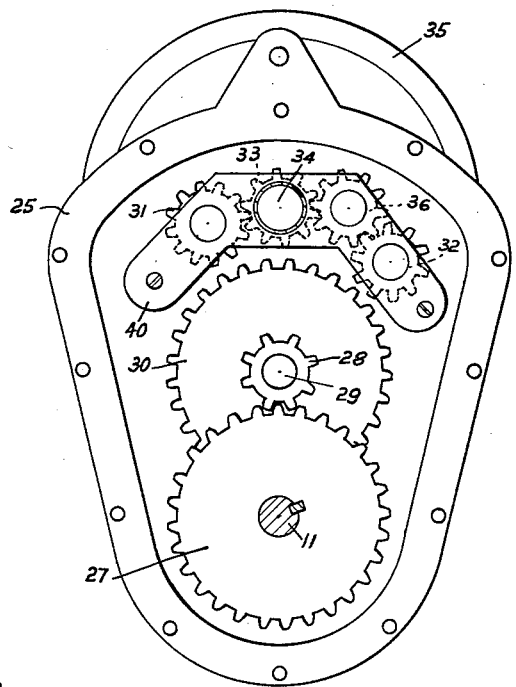
Fig. 3 is a view of the power transmission housing with a face plate removed to illustrate the interior gear trains.
Figure 4:
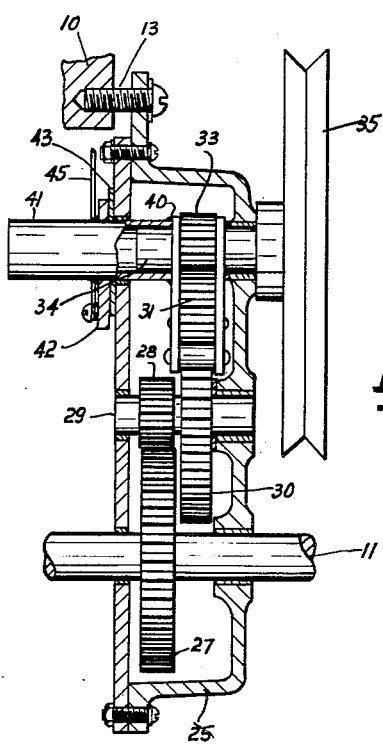
Fig. 4 is a sectional view through the power transmission housing to further illustrate the details of the gear trains therein.

Each of the gear wheels 31, 32 and 36 of the power transmitting gear train are mounted on individual spaced axes carried by a rocker arm 40 rotatably supported intermediate its ends on a sleeve 41 encircling the pulley shaft 34. With the gear wheels 31 and 32 disposed at opposite extremities of the arm 40, it will be readily apparent that by swinging the rocker arm 40 in either direction about the shaft 34, the corresponding gear wheel 31 or 32 will engage the speed reducing gear wheel 30 of the power receiving gear train. Referring to Fig. 3 of the drawings when the rocker arm 40 is rotated about the pulley shaft 34 so that the gear wheel 32 engages the gear wheel 30, it will drive the wheel axle 11 in one direction while, if the rocker arm 40 is swung in the other direction so that the gear wheel 31 engages the gear wheel 30, the wheel axle 11 will be driven in the opposite direction. Likewise, if the rocker arm 40 is maintained in a level or neutral position so that neither of the gear wheels 31 or 32 are in engagement with the gear wheel 30, the power transmission mechanism is effectively isolated from the power unit 15.

The rocker arm 40 can be effectively positioned to any of the foregoing operative locations by moving the lever arms 42 and 43 fixed on the sleeve 41. The lever 42 is connected to a link 45 extending rearwardly along the handle bars to an operating handle 46 so that the operator may manipulate the link 45 to tilt the rocker arm 40 in at least one direction about the pulley shaft 34. In the preferred form shown and described herein, the other lever 43 is connected to the tractor frame 10 by a helical compression spring 47 which biases the rocker arm 40 to a position where the forward drive gear wheel 31 is engaged. This arrangement permits the operator to have his hands free to steer and guide the tractor while it is operating without having at the same time to maintain the operating handle 46 in a position to keep the wheels drivingly engaged with the power takeoff.

With this arrangement, an operator can control the application of power to the driving wheels of the tractor by a simple manipulation of the handle 46. In the preferred embodiment, the operator would move the control handle 46 to position the rocker arm 40 to a neutral position while starting the engine and thereafter release the handle to permit engagement of the forward driving gear wheel 31 with the gear wheel 30; it being only necessary to manipulate the handle 46 again when it is desired to either reverse the direction of wheel drive or otherwise isolate the wheel axle from the power take-off on the engine. The mechanism is simple in design and construction and the application of power is conveniently controlled by an operator by simply manipulating a single handle, thereby making available to him a range of tractor operation not readily obtainable in conventional garden implements of this type.

I have shown and described what I consider to be the preferred embodiments of my invention along with suggested modifications and forms, and it will be obvious to those skilled in the art that other changes and modifications may be made without departing from the scope of my invention as defined by the appended claims.

I claim:

1. A power transmission for a wheeled tractor frame having a power unit and a wheel axle and comprising in combination, a gear wheel keyed on the wheel axle at one side of the tractor frame, a housing enclosing said gear wheel and having an extended portion secured to the tractor frame, a shaft drivingly coupled to the power unit and journaled in the extended portion of the housing, a speed reducing gear wheel and a pinion journaled on a shaft in the housing between said power driven shaft and said first gear wheel with the pinion meshing with the first gear wheel, a second gear wheel keyed on the shaft within the housing, a rocker arm journaled intermediate its ends on the shaft within the housing, a third and a fourth gear wheel rotatably carried on each end of the rocker arm for independent driving coaction with the second gear wheel respectively, a follower gear wheel rotatably mounted on the rocker arm between said second and fourth gear wheels and adapted to coact to rotate the fourth gear wheel in a direction opposite to that of the third gear wheel, and means for selectively tilting the rocker arm in either direction to cause either the third or the fourth gear wheel to mesh with said speed reducing gear wheel to drive the tractor wheels in a forward or reverse direction respectively.

2. The power transmission of claim 1 wherein said last-mentioned means includes a pair of levers fixedly connected to the rocker arm external to the housing, a manually operable handle having a link connection to one of said levers and adapted to rotate the rocker arm into either neutral or reverse drive position, and resilient means coacting between the other lever and the tractor frame to bias said rocker arm in the forward drive position.

3. A power transmission for a wheeled tractor frame having a power unit and comprising in combination, a power receiving member drivingly coupled to the tractor wheels, power transmitting means driven by the power unit and including a pair of power transmitting members driven in opposite directions, releasable means biased to automatically maintain a driving connection between one of said driven members and the power receiving member, and other means adapted for coaction therewith to remove the driving connection with said one driven member and to selectively effect a driving connection with the other driven member or to isolate the power receiving member from either driven member and wherein said releasable means includes a rocker arm pivotally supported intermediate its ends adjacent the power receiving member with said driven members operatively supported at opposite ends of the arm in non-driving position relative to the power receiving member and with a compression spring coacting between the rocker arm and the tractor frame to bias the arm in a tilted position to maintain a driving connection between one of the driven members and the power receiving member, and wherein said last-mentioned means includes a manually operable member adapted for coaction between the rocker arm and tractor frame to tilt the rocker arm to disengage said driving connection and to selectively establish a driving connection with the other driven member or otherwise isolate each of said driven members from a driving connection with said power receiving member.

4. A power transmission for a wheeled tractor frame having a power unit and comprising in combination, power receiving means including a gear wheel drivingly coupled to the tractor wheels, power transmitting means including a pair of gear wheels driven in opposite directions by the power unit, a housing enclosing all of said gear wheels and secured to the tractor frame, a rocker arm pivotally supported intermediate its ends within the housing adjacent the power receiving gear wheel, said driven gear wheels being operatively carried at opposite ends of the rocker arm out of engagement with said power receiving gear wheel, a resilient member coacting between the rocker arm and the tractor frame to bias the rocker arm in a tilted position with one of said driven gear wheels drivingly engaging the power receiving gear wheel, and manually operable means adapted for coaction between the tractor frame and the rocker arm to disengage said one driven gear wheel from the power receiving gear wheel and to selectively engage the other driven gear wheel therewith or otherwise to maintain the rocker arm in a position where neither of the driven gear wheels engage the power receiving gear wheel.

References Cited in the file of this patent

UNITED STATES PATENTS

| | | |
|---|---|---|
| 2,078,128 | Doran | Apr. 20, 1937 |
| 2,476,983 | Knox et al. | July 26, 1949 |